United States Patent Office 3,285,886
Patented Nov. 15, 1966

3,285,886
THRESHOLD TREATMENT OF WATER WITH WATER DISPERSIBLE COMPLEXING POLYMERS
Lewis O. Gunderson, Morton Grove, and Herman Kerst, Des Plaines, Ill., assignors, by mesne assignments, to W. R. Grace & Co., New York, N.Y., a corporation of Connecticut
No Drawing. Filed Feb. 20, 1963, Ser. No. 260,056
15 Claims. (Cl. 260—80.3)

This is a continuation-in-part of application Serial No. 124,350, filed July 17, 1961, and now abandoned.

The present invention relates to the treatment of aqueous systems for the inhibition of scale formation and to composition useful for that purpose.

The deposition of scale, primarily calcium or magnesium carbonates, phosphates, sulfates, hydroxides, and the like on heat transfer surfaces is one of the serious problems confronting the operators of heat exchange equipment in the utility, industrial, nuclear power, and desalination fields. One of the manners in which the formation of insoluble deposits on heat transfer surfaces can be prevented involves tying up the alkaline earth anions in the water in a form in which they will not react with the cations which form deposits and, therefore, will not precipitate or crystallize out of the aqueous solution. This can be done by treating the ions with stoichiometric quantities of the so-called chelating or complexing compounds which react with the metallic ions to form stable water soluble complexes in which the cations are held so firmly that they cannot combine with anions to produce insoluble precipitates. The elimination of undesirable ions by chelation is, however, an expensive process, since substantial quantities of the expensive chelating agents must be employed. For example, at the most, one molecule of ethylene diamine tetraacetic acid, one of the most common chelating agents, is capable of reacting with two calcium ions. The cost of such treatment, therefore, becomes prohibitive in large scale water treating installations.

An allied treatment which has been practiced very extensively on a commercial scale involves the use of polyphosphates described as molecularly dehydrated alkali metal phosphates. The use of these materials does not require the presence of stoichiometric quantities of the polyphosphate to prevent the precipitation of calcium carbonate, since they apparently function by interfering with the growth of crystal nuclei and thereby prevent the deposition of insoluble deposits. This is known as the "threshold" treatment of water, and this process has been the subject of substantial experimentation. One of the earliest descriptions of the process appears in United States Patent No. 2,038,316 to Rosenstein. In 1939, Reitemeier and Buehrer, in the Journal of Physical Chemistry, volume 44, pages 535 to 574, described the inhibiting action of minute amounts of sodium hexametaphosphate on the precipitation of calcium carbonate from solutions. They showed that the number of crystals formed in the presence of polyphosphate was greatly reduced, the size was increased, and the shape was distored. They postulated that the threshold effect of the polyphosphate on calcium carbonate was made possible by the adsorption of the polyphosphate on the crystal faces of the nuclei, preventing growth of the crystals and distorting those which had already formed. Only in this way is it possible to explain the effect of the very minute quantities of polyphosphates, on the order of a few parts per million or less, in preventing the deposition of calcium carbonate, and also exercising some control over thte formation of calcium sulfate or calcium phosphate deposits, and also magnesium containing deposits. No other inorganic compounds have been found which possess these threshold effects. Other explanations of the threshold effects will be found in the publications of Hatch and Rice appearing in the Industrial and Engineering Chemistry of January 1939 and August 1945.

The use of polyphosphates is, however, not without its disadvantages. In an aqueous solution, the polyphosphates are hydrolyzed by water to orthophosphates which react with calcium to produce insoluble precipitates of calcium phosphate. The use of polyphosphate, therefore, requires careful control of the environmental conditions such as temperature, pH, calcium content, and polyphosphate content, together with regulation of the residence time of the treatment in the system so that the deposition of calcium phosphate may be prevented. This hydrolytic instability of the polyphosphates has limited the use of the polyphosphates in various applications.

The present invention relates to the treatment of water for the inhibition of crystalline scale formation from alkaline earth salts, through the use of organic polymers which have complexing properties and which also exhibit threshold effects. Thus, with the materials of the present invention, we are able to secure the deactivation of the ions as in chelation, at dosage levels which have heretofore been used only with the inorganic polyphosphates.

The complexing polymers of the present invention are also useful for other types of water treatment, such as control of boiler sludges, inhibition of corrosion, and treatment of brackish and waste waters, and the like.

An object of the present invention is to provide an improved process for the inhibition of scale in aqueous systems.

A further object of the invention is to provide a scale inhibiting process employing materials which are used at low dosage levels, considerably less than stoichiometric quantities, and still do not have the undesirable hydrolytic instability of polyphosphates.

A further object of the invention is to provide an improved series of organic polymers which evidence complexing properties and hydrophilicity.

The present invention relates to certain complexing polymers containing chelating ligands and hydrophilic groups distributed in the polymeric molecule. Whe have found that certain complexing polymers, whose preparation will be described subsequently, exhibit threshold effects in inhibiting crystal formation of polyvalent metal salts. They act upon calcium and magnesium salts in aqueous solutions, interfering with and/or preventing formation or deposition of scale on heat exchange or other surfaces, and inhibiting the formation of insoluble sludges. The polymers employed according to the present invention are relatively stable to hydrolytic cleavage, and are, therefore, not subject to the same disadvantages as the polyphosphates. In addition, their hydrolytic products do not form insoluble calcium salts, and, therefore, do not contribute to the build-up of insoluble materials either in suspension or on heat transfer surfaces.

Chelates are organo-metallic chemical compounds in which the outer shell of electrons around the central metal atom, which shell may still be incomplete after satisfaction of the primary valences by reaction with the anions of the acids, is filled and stabilized by the donation of electrons from the outer shells of so-called donor atoms. When the donor atom is a part of the same molecule as the primary valence cation, a ring type structure known as a chelate ring is formed, and due to resonance around the ring so formed, these structures are stabilized electronically. In this way, the metal atom is bound more firmly than in ordinary primary valence salt formation.

The complex compound may contain one or more such rings. The resulting compound is called a chelate, and the ion which is reacting with the metal is said to be a chelating agent. The chelates may or may not be water soluble; many of them are quite insoluble. However, when the resulting chelate is water soluble the chelating agent may be termed a sequestering agent because the metallic ion is sequestered in a water soluble form.

Complexes and chelates are formed by nearly all of the metals of the periodic system, and some of the non-metals. The donor atoms which complete the chelate ring are substantially restricted to the strongly non-metallic elements of groups 5 and 6 of the Periodic Table, such as nitrogen, oxygen, phosphorous, sulphur and the like. The primary salt forming valence groups may be sulfate, sulfide or sulfonate groups, the carboxylic acid group, phosphate or phosphonate groups, or groups such as arsenates, arsonates, phenolates, oximes, or keto-enol tautomeric groups. The electron donating groups actually present in the chelating compounds may be in the form of hydroxyl, amide, ester, ether, amino, or quaternary ammonium groups or the like.

We have found that certain types of complexing agents containing chelating ligands, when prepared with a mixture of primary and secondary complexing groups attached to a polymeric backbone, and of such chemical composition and molecular weight that they are water soluble or dispersible, exhibit not only a chelating effect, but also the threshold effect characteristic of the inorganic polyphosphates.

The mono-carboxymethylamino and di-carboxymethylamino compounds form the basis of some of the most useful chelating and complexing compounds of the type which will be described herein. The mono-carboxymethylamino chelates are of relatively low stability, while the di-carboxymethylamino compounds form complex coordination compounds of extremely high stability.

We have found that when a plurality of dicarboxymethylamino groups are inserted into the structure of a linear polymer, complexing polymers can be produced. We have found, furthermore, that when groups of this type are present in a copolymer in conjunction with hydrophilic complexing groups such as hydroxyl, amino, amido, keto, ether, ester, sulfide, diazo, quaternary nitrogen, and the like, polymers with threshold effects are produced.

The polymeric backbone to which complexing ligands may be attached may be linear or two-dimensional but it is preferably linear since such types of polymers are more easily dissolved or dispersed in water. The polymeric backbone may consist completely of carbon to carbon linkages, or may be made up by the condensation of monomeric compounds which produce carbon-oxygen-carbon, carbon-nitrogen-carbon, carbon-phosphorous-carbon linkages, or various other types of polymeric structures. The arrangement of the chelating ligands and the hydrophilic donor groups in the polymeric chain is substantially at random when the products are produced by standard synthetic methods.

The molecular weight of the materials has some effect on their activity, and accordingly polymers of this type, water soluble or colloidally dispersible in water, should have molecular weights within the range of about 5,000 to about one million, with the preferred range being from 20,000 to 200,000.

The polymeric compounds of the present invention can be prepared in several different ways. In one of these, an existing polymer or copolymer already containing non-salt forming hydrophilic donor groups is reacted with a reagent which will insert the chelating ligands into the copolymer. This procedure has certain limitations, since the method for inserting the chelating groups must be selected in such a way that it does not seriously modify the already present hydrophilic groups.

Another general procedure is to synthesize monomers having the requisite chelating structures and then to polymerize or copolymerize these monomers with other monomers having the desired hydrophilic groups. This polymerization may be either condensation polymerization by elimination reactions between reactive groups or addition polymerization between unsaturated olefinic groups in the monomers. Still another method consists in the synthesis and polymerization of a monomer having both chelating and hydrophilic donor groups.

The steric arrangement of groups within the resulting copolymer is important since the stability of chelates depends on the size of the chelate ring and, this in turn, depends upon the arrangement and type of groups in the molecule. At the same time, the number and type of non-salt forming hydrophilic groups in the molecule determine the water solubility or dispersibility, and the threshold effectiveness of the copolymer.

The following examples of the preparation and testing of chelating polymers serve to illustrate the practice of our invention without limiting the disclosure to them. First we will describe the preparation of the monomers.

MONOMERS (1) *Dicarbethoxymethylacrylamide.*—A one-liter, three-necked flask was equipped with stirrer, reflux condenser, dropping funnel, and drying tube. In it were placed 300 ml. benzene, 113 g. (0.6 mol.) of diethylimino diacetate; 66 g. (0.65 mol.) of triethylamine; and 0.5 g. cuprous chloride. The mixture was stirred while 54 g. (0.6 mol.) of acrylyl chloride was slowly added, during which there was an exothermic reaction. It was stirred for ½ hour without heating and finally refluxed for one hour. The reaction mass was cooled and the precipitate of triethylamine hydrochloride filtered off. Cuprous chloride was added to the filtrate which was then distilled. The product was collected at 146°/2–3 mm. and weigh 58 g. (70% of theory).

(2) *Di(2-hydroxyethyl)acrylamide.*—A one-liter three-necked flask was equipped with stirrer, dropping funnel, and thermometer. It was charged with 87 g. (0.83 mol.) of diethanolamine, 101 g. of triethylamine, and 214 g. of acetonitrile. During a period of 3.5 hours, 75 g. (0.83 mol.) of acrylyl chloride was added, while stirring and holding the temperature at 10°–13° C. The precipitated triethylamine hydrochloride was filtered off and the ambient filtrate used as a solution of the monomer.

(3) *Monocarbethoxymethyl acrylamide.*—A one-liter three-necked flask was fitted with stirrer, dropping funnel and thermometer. In it were placed 38.5 g. (0.276 mol.) of ethyl-glycinate hydrochloride, 56 g. (0.552 mol.) triethylamine, and 600 ml. chloroform. To this was added slowly a solution of 25 g. (0.276 mol.) of acrylyl chloride in 100 ml. chloroform, while maintaining the temperature at about 10° C. After removal of chloroform under vacuum, the residue was slurried with benzene, and the insoluble triethylamine hydrochloride filtered off. The filtrate contained 10.2% monomer.

(4) *Mono(2-hydroxyethyl)acrylamide.*—A one-liter three necked flask was equipped with dropping funnel, stirrer, and thermometer. In it were placed 101.4 g. (1.66 mol.) of ethanolamine and 100 g. purified acetonitrile. A solution of 75 g. (0.83 mol.) of acrylyl chloride in 100 g. of acetonitrile was added clowly while stirring and keeping the temperature at −5° to −10° C. The reaction mass was stirred at −10° C. for an additional 17 hours, and the amine hydrochloride removed by filtration. The colorless filtrate contained about 30% monomer.

The preparation of the copolymers is described in the following section:

COPOLYMERS (5) *Copolymer of dicarboxymethyl acrylamide and dihydroxyethyl acrylamide.*—A 500 ml. three-necked flask was fitted with stirrer and reflux condenser. In it were placed 22.6 g. (0.093 mol.) of dicarbethoxymethyl acrylamide, 0.48 g. benzoyl peroxide, and 189 g. of acetonitrile solution containing 14.7 g. (0.093 mol.) of dihydroxyethylacrylamide. Refluxing for one hour yielded a gelatinous mass which formed a white precipitate when poured into water. The separated polymeric ester was saponified and dissolved by refluxing for 3 hours with 80 ml. (0.20 equiv.) of 2.5 N sodium hydroxide, yielding a solution with a pH of 8.1 and 23.6% solids. A dialyzed sample of the copolymer had an intrinsic viscosity of 0.330 in 0.1 N sodium bicarbonate solution at 25° C.

It is believed the copolymer had the following approximate structural arrangement with carboxymethyl and hydroxyethyl groups distributed through the molecule more or less heterogeneously:

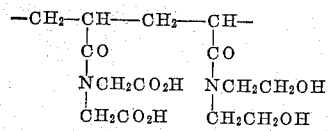

(6) *Copolymer of dicarboxymethyl acrylamide and monohydroxyethyl acrylamide.*—A 250 ml. three-necked flask was equipped with stirrer and reflux condenser. In it were placed 20 g. (0.08 mol.) of dicarbethoxymethyl acrylamide, 9.6 g. (0.083 mol.) of hydroxyethyl acrylamide (in 32 g. of the original acetonitrile solution), 30 ml. acetonitrile and 0.3 benzoyl peroxide. Since there was no apparent reaction after 9 hours of refluxing, the solvent was removed by distillation and an extra 0.2 g. benzoyl peroxide was added. After heating at 160° C. for 7 hours, a very viscous mass resulted. It was saponified and dissolved by refluxing with 72 ml. (0.18 equiv.) of 2.5 sodium hydroxide for 9 hours. After clarification, by filtration this solution had a pH of 8.6 and contained 22.5% solids. The dialyzed copolymer had an intrinsic viscosity of 0.405 in 0.1 N sodium bicarbonate solution at 25° C.

The copolymer is believed to have approximately the following structure distributed hetero geneously therethrough:

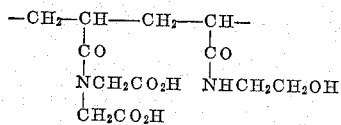

(7) *Copolymer of monocarboxymethyl acrylamide and dihydroxyethyl acrylamide.*—A 250 ml. three-necked flask was equipped with stirrer, thermometer, and reflux condenser. In it were placed 20 g. (0.13 mol.) of monocarbethoxymethyl acrylamide, 0.3 g. benzoyl peroxide, and 20 g. (0.13 mol.) dihydroxyethyl acrylamide (obtained by evaporating the acetonitrile solution). The mixture was heated at 150° C. for 5 hours, giving a very viscous product. It was saponified and dissolved by refluxing with 56 ml. (0.14 equiv.) of 2.5 N sodium hydroxide for 6 hours, producing a brown solution of pH 7.9 and 39.7% solids. The dialyzed copolymer had an intrinsic viscosity of 0.063 in 0.1 N sodium bicarbonate solution at 25° C.

This product is believed to contain the following alternating groupings:

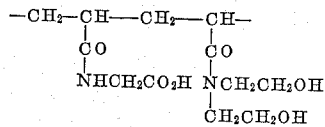

(8) *Copolymer of monocarboxymethyl acrylamide and monohydroxyethyl acrylamide.*—A 250 ml. three-necked flask was equipped with reflux condenser and stirrer. In it were placed 20 g. (0.13 mol.) of monocarbethoxymethyl acrylamide, 50 ml. of acetonitrile, 0.5 g. of benzoyl peroxide, and 51 g. of an acetonitrile solution containing 15 g. (0.13 mol.) of monohydroxyethyl acrylamide. The solution was refluxed for 2 hours, then the solvent distilled out. The viscous residue was saponified and dissolved by refluxing for 5 hours with 52 ml. (0.13 equiv.) of 2.5 N sodium hydroxide. After adjustment to pH 9.0 with 11.8 ml. N hydrochloric acid, the tan solution contained 32.1% solids. The dialyzed copolymer had an intrinsic viscosity of 0.550 in 0.1 N sodium bicarbonate solution at 25° C.

The copolymer is believed to have the following approximate structure; in generally alternating form:

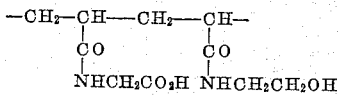

(9) *Copolymer of carboxymethyl acrylamide and acrylic acid.*—A solution of 23 g. (0.147 mol.) of N-(carbethoxymethyl)acrylamide, 10.5 g. (0.147 mol.) of redistilled acrylic acid, and 0.3 g. of benzoyl peroxide in 30 ml. of benzene was heated and stirred in a 250 ml. flask. Part of the benzene was distilled out, at which point a very exothermic reaction took place, yielding a hard solid polymer. It was hydrolyzed by refluxing in 121 ml. (0.30 mol.) of 2.5 N sodium hydroxide solution for 4 hours. The solution obtained was very viscous. It was cooled, neutralized to pH 8.0 with hydrochloric acid, and precipitated with one liter of acetone. After drying in vacuum, the product was a brittle, white solid, weighing 16.5 g. The intrinsic viscosity in 0.1 N sodium bicarbonate solution at 25° C., was 3.88. This copolymer gave a high oxalate titration figure and a threshold test pH drop of 0.22, indicating good threshold activity at a 10 p.p.m. dosage level. In comparison, a monocarboxymethyl polyacrylamide homopolymer without the hydrophilic carboxy groups in the copolymer gave a threshold test pH drop of 0.42.

This copolymer is believed to have the following approximate structure in alternating form:

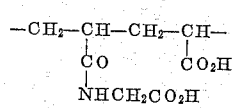

This concept of invention includes methods of synthesis based on partially hydrolyzed polyacrylonitrile, which product, before carboxymethylation, would contain residual nitrile groups and carboxylic acid groups, in addition to amide groups. It is recognized that the nitrile groups in the base reactant may contribute to the threshold effect.

These copolymers were tested for chelating power by the oxalate titration. A one-gram sample of chelating polymer is dissolved in 100 ml. distilled water, excess sodium oxalate solution is added, the pH adjusted to 11–12 with sodium hydroxide, and the mixture titrated with N/10 calcium acetate solution to the appearance of turbidity. Results are reported in terms of mg. of calcium sequestered per gram of chelate.

The threshold effectiveness of these polymers was tested as follows: A solution is prepared containing 16 grains of calcium bicarbonate per gallon, by bubbling $CO_2$ through a $CaCO_3$ suspension until it is all dissolved, and then passing air through to remove excess $CO_2$ until the pH reaches 7.3. To 100 ml. of this solution is added enough of the copolymer under test to give the required dosage (usually 1–10 p.p.m.), and then 2 ml. of N/10 sodium hydroxide. The pH immediately rises to 9.3. The solution is stirred continuously at room temperature, and the change of pH with time is followed. If no threshold agent is present, calcium carbonate precipitates, and the pH drops to about 8.0–8.2. If an effective threshold agent for $CaCO_3$ control is present, no precipitate forms and the pH does not change. Partially effective materials give intermediate results. Figures are given as the difference between the original and final pH, and the smaller this figure, the more effective the copolymer. For comparison purposes, polyphoshpates give zero pH drops at dosages as low as 1 p.p.m.

The results of oxalate titrations and threshold tests are shown in Table I. For comparison, the results of tests with a homopolymer are included.

*Table I*

| Copolymer, 10 p.p.m. dosage | Oxalate Titration, Mg.Ca/Gram | Threshold Test (ΔpH) |
|---|---|---|
| Di(carboxymethyl)di(hydroxyethyl)polyacrylamide | 47 | 0.00 |
| Mono(carboxymethyl) mono(hydroxyethyl) polyacrylamide | 20 | 0.85 |
| Di(carboxymethyl) mono(hydroxyethyl) polyacrylamide | 30 | 0.48 |
| Mono(carboxymethyl) di(hydroxyethyl) polyacrylamide | 14 | 0.80 |
| Dicarboxymethyl polyacrylamide | 76 | 0.97 |
| Polyacrylamide | 4 | 0.90 |
| Copolymer of carboxymethyl acrylamide and acrylic acid | | 0.22 |
| Mono(carboxymethyl) polyacrylamide homopolymer | | 0.42 |

The dosage levels for the various copolymers will vary depending upon the particular systems in which they are employed. In any event, they are used in quantities substantially less than would be indicated by stoichiometric consideration. A typical dosage level for the copolymers of the present invention will be on the order of 0.5 to 10 parts per million.

The complexing polymers of this invention, in addition to their utility for the control of scale and deposits, as previously described, also are useful for other water treatment applications, including control of boiler sludge quality; inhibition of corrosion in aqueous systems; and treatment of brackish waters, industrial waste waters, and the conversion of saline waters.

It should be evident that various modifications can be made to the described embodiments without departing from the scope of the present invention.

We claim as our invention:

1. A water dispersible polymer having complexing properties consisting essentially of a linear aliphatic backbone with side chains of N - carboxymethyl amide groups, N - carboxymethyl amide and N - (2 - hydroxyethyl) amide groups, or N - carboxymethyl amide and carboxylic acid groups.

2. The polymer of claim 1 wherein the N-carboxymethyl amide groups are N,N-dicarboxymethyl amide groups.

3. The polymer of claim 1 wherein the N-(2-hydroxyethyl) amide groups are N,N-di-(2-hydroxyethyl) amide groups.

4. The polymer of claim 1 wherein the side chains are N,N - dicarboxymethyl amide and N,N - di - (2 - hydroxyethyl) amide groups.

5. The polymer of claim 1 wherein the side chains are N - monocarboxymethyl amide and N - mono - (2 - hydroxyethyl amide groups.

6. The polymer of claim 1 wherein the side chains are N,N - dicarboxymethyl amide and N - mono - (2 - hydroxyethyl) amide groups.

7. The polymer of claim 1 wherein the side chains are N - monocarboxymethyl amide and N,N - di - (2 - hydroxyethyl) amide groups.

8. The polymer of claim 1 wherein the side chains are N,N-dicarboxymethyl amide groups.

9. The polymer of claim 1 wherein the side chains are N-carboxymethyl amide and acrylic acid groups.

10. The polymer of claim 1 wherein the side chains are N-monocarboxymethyl amide groups.

11. A method of treating an aqueous system to complex alkaline earth metal salts therein which comprises dispersing into said system the polymer described in claim 1.

12. A method of treating an aqueous system for the inhibition of crystalline scale formation by an alkaline earth metal salt which comprises dispersing into said system the polymer described in claim 4 in an amount substantially less than required stoichiometrically to react completely with said alkaline earth metal salt.

13. A method of treating an aqueous system for the inhibition of crystalline scale formation by an alkaline earth metal salt which comprises dispersing into said system the polymer described in claim 6 in an amount substantially less than required stoichiometrically to react completely with said alkaline earth metal salt.

14. A method of treating an aqueous system for the inhibition of crystalline scale formation by an alkaline earth metal salt which comprises dispersing into said system the polymer described in claim 9 in an amount substantially less than required stoichiometrically to react completely with said alkaline earth metal salt.

15. A method of treating an aqueous system for the inhibition of crystalline scale formation by an alkaline earth metal salt which comprises dispersing into said system the polymer described in claim 10 in an amount substantially less than required stoichiometrically to react completely with said alkaline earth metal salt.

References Cited by the Examiner

UNITED STATES PATENTS

| | | | |
|---|---|---|---|
| 2,718,515 | 9/1955 | Thomas | 260—80.5 |
| 2,840,603 | 6/1958 | Mock et al. | 260—2.1 |
| 2,888,441 | 5/1959 | Morris | 260—2.1 |
| 2,910,445 | 10/1959 | Mock et al. | 260—2.1 |
| 2,980,610 | 4/1961 | Ruehrwein | 210—58 |
| 3,022,279 | 2/1962 | Profitt | 260—89.7 |
| 3,099,521 | 7/1963 | Arensberg | 210—58 |

JOSEPH L. SCHOFER, *Primary Examiner.*

H. I. CANTOR, *Assistant Examiner.*